March 23, 1943. P. E. GAIRE 2,314,616
FISHING REEL
Filed Aug. 26, 1940 2 Sheets-Sheet 1
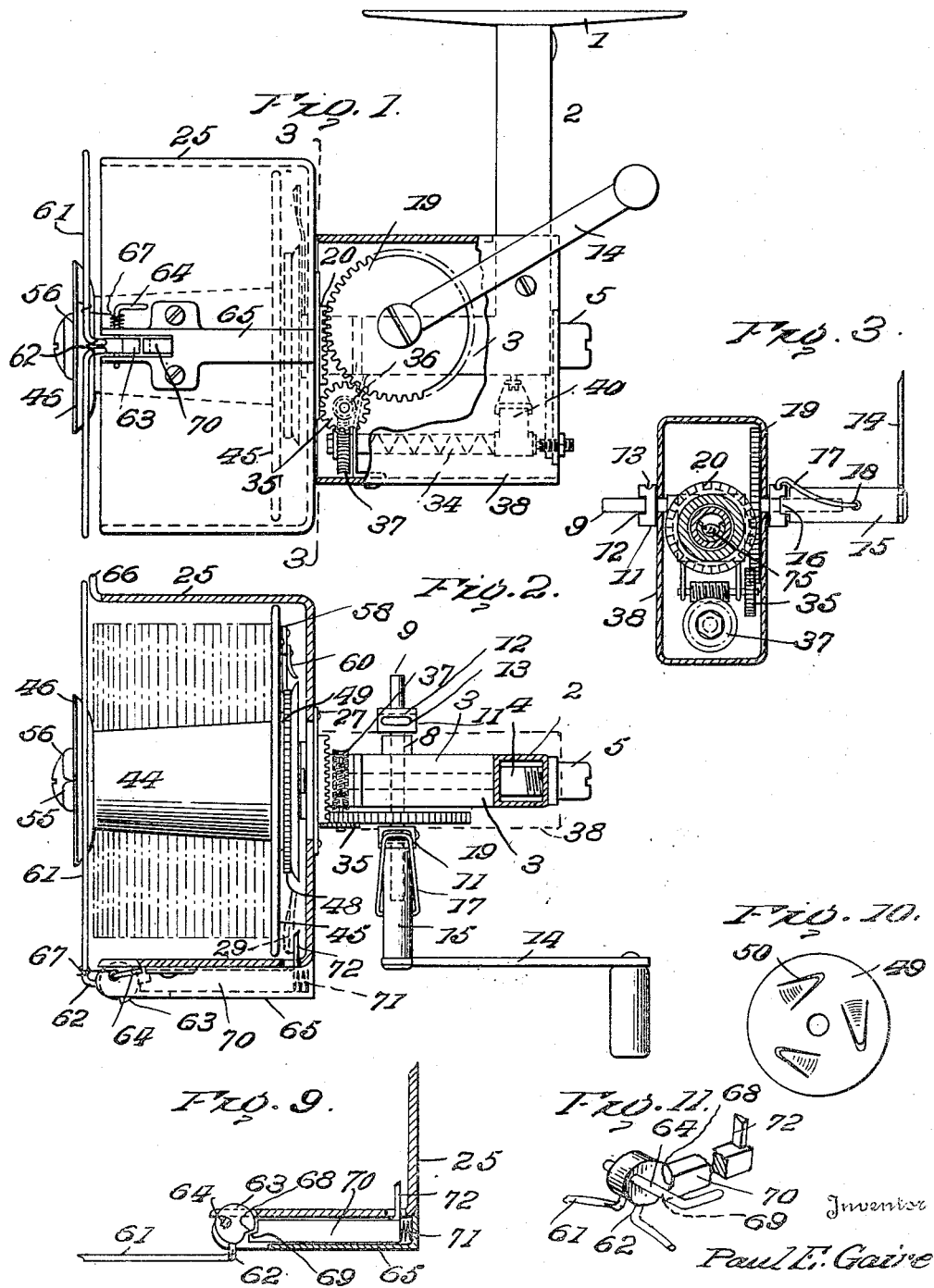
Inventor
Paul E. Gaire
By
Attorney

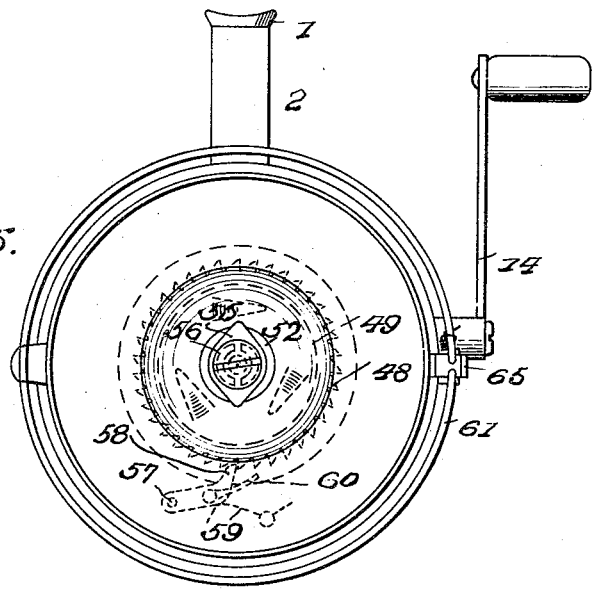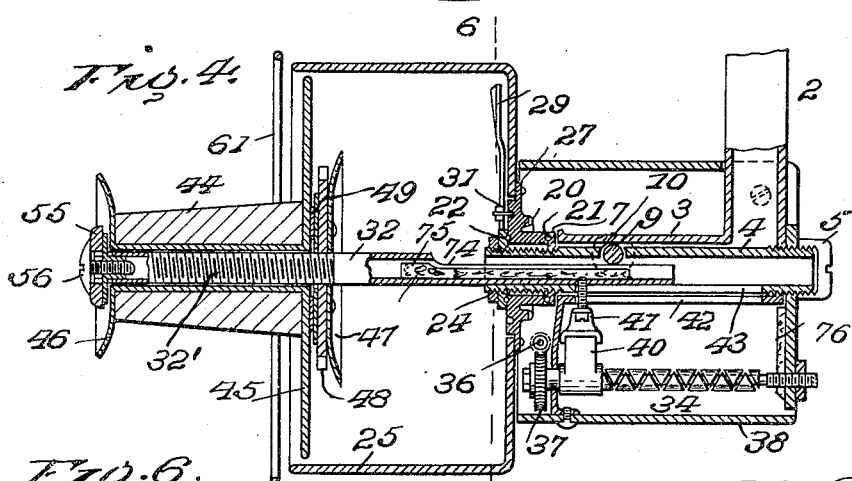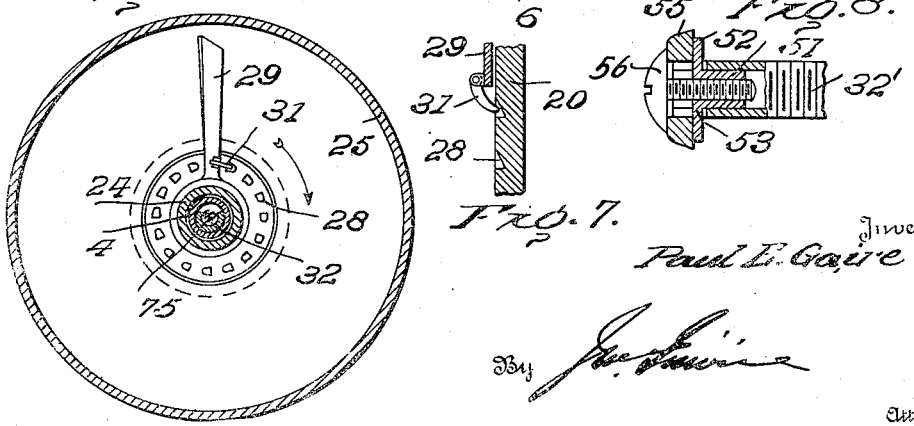

Patented Mar. 23, 1943

2,314,616

UNITED STATES PATENT OFFICE 2,314,616

FISHING REEL

Paul Edmond Gaire, Weehawken, N. J.

Application August 26, 1940, Serial No. 354,317
In Belgium January 13, 1940

16 Claims. (Cl. 242—84.6)

The invention is directed to an improvement in fishing reels constructed particularly for use in bait casting and providing means whereby the line may be quickly, effectively and smoothly wound upon the spool when necessary, and wherein the spool is designed for free running in the unwinding or casting of the line.

The primary object of the present invention is the provision of a fishing reel in which the line spool is held against rotation both in casting and when the line is being wound upon the reel, a revolving cage and pick-up being arranged to cooperate with the spool for winding the line thereon.

A further object of the invention is the provision of a spool having such relation to the revolving cage that the spool is compelled to move axially of the cage inwardly and outwardly during the winding on of the line to ensure the even smooth distribution of the line wound on the spool.

A further object of the invention is the provision of means whereby the cage and pick-up for winding the line on the spool is prevented from being rotated in a direction opposite to that necessary for the winding up of the line, whereby the possibility of laxity in the winding of the line and the entanglement of the line are prevented.

A further object of the invention is the provision of means whereby the reel may be operated from either the left hand or right hand side through a mere shifting of the winding handle, thereby causing the reel of the present invention to suit the convenience of either a right hand or left hand user.

The invention is illustrated in the accompanying drawings, in which Figure 1 is a view in elevation of the improved reel.

Figure 2 is a plan view of the same, the parts being shown in section.

Figure 3 is a sectional view on the line 3—3 of Figure 1.

Figure 4 is a longitudinal section through the reel.

Figure 5 is an end view of the reel.

Figure 6 is a section on the line 6—6 of Figure 4.

Figure 7 is a section partly in elevation of a detail.

Figure 8 is a section partly in elevation of the brake control means.

Figure 9 is a broken longitudinal section partly in elevation showing the means for controlling the movement of the pick-up.

Figure 10 is a view in elevation of the friction brake for the spool.

Figure 11 is a detail view of the pick-up ring holding means.

The improved construction includes a rod plate 1 designed to be removably connected to the rod by an ordinary clamping means (not shown) from which rod extends a standard 2, preferably hollow, which, at the lower end has a hollow lateral right angular extension 3.

Rotatably in the extension is a hollow shaft 4 closed and secured at one end by a cap 5 (see Fig. 4). The extension 3 is of less length than the shaft 4 and a nut 7 is threaded on the projecting end of the shaft 4 to bear against the free end of the extension 3 to hold the shaft in position. A sleeve 21 surrounds the extended end of the shaft 4 bearing between the nut 7 and a second nut 22 threaded from the shaft 4 beyond the sleeve. The sleeve is mounted for rotative movement and preferably has anti-friction bearing with the nuts 7 and 22, and a clamping nut 24 is secured upon the threaded end of the shaft 4 beyond the nut 22 to hold the parts in cooperative relation.

The sleeve 21 is provided with a concentric annular extension 27 which, on the face toward the standard 2, is formed with a longitudinal offset gear 20, the opposite face of the extension 27 being formed with an annular series of depressions 28 (see Figs. 6 and 9). The nut 22 is provided with a radial extension 29 in the shape of a narrow arm which is provided with a pawl 31 cooperating with the depressions 28 in such a manner as to permit the extension 27 to turn in one direction and prevent it from turning in the opposite direction.

The outer or free end of the arm 29 is twisted to present a slight cam-like surface for the purpose which will later appear. The construction includes what may be termed a cage 25. This cage comprises a cylindrical wall having a rear wall extension formed with a central opening to permit the projection therethrough of the extension 27 to a degree to provide that the arm 29 and that portion of the extension 27 including the depressions 28 extend through the rear wall of the cage. The cage is secured to the extension 27 by fixing the rear wall of the cage to the extension in the margin beyond the depressions 28, as will be clear from Figure 4 of the drawings. In this position, it will be appreciated that the arm 29 is wholly within the cage and immediately adjacent but free of the rear wall thereof. The forward end of the cage,—that is, the end remote from the standard 2, is fully and completely open.

The cage is the element which is to be rotated in the winding of the line on the spool, and as this in the present type of reel and as usual in the ordinary conventional type of reel, is a hand operation at the will of the user, there is mounted in the extension 3 a transverse shaft 9, the shaft 3 being provided with bearing extensions 8 as more particularly shown in Figure 2.

The shaft 9, as shown in Fig. 4, extends through the extension 3 at one side of the axial line thereof and the hollow shaft 4 is cut away at 10 to permit the passage of the shaft 9. The shaft 9 projects in both directions beyond the extension 3 in order to provide for right or left hand operation of the reel as may be more convenient, and each end of the shaft immediately beyond the extension 8, and as more particularly shown in Figure 3, is provided with a fixed cylindrical block 11, through and beyond which the shaft 9 extends, with the block provided with diametrically opposed depressions 12. Each block is also provided with a partly annular channel 13 in the side wall thereof.

The operating handle includes a sleeve 15 with a handle extension 14 secured to the outer end thereof. The inner end of the sleeve has a central bore to snugly fit the extension of the shaft 9 and is provided on opposite sides of the bore with projections 16 to engage in the depressions 12 in the block 11.

A U-shaped wire securing element 17 is swingingly supported at 18 on the sleeve 15, this element having a terminal cross bar which, when the projections 16 of the sleeve 15 are seated in the depressions 12 of the block 11, may engage in the annular depressions 13 to temporarily hold the operating handle locked with respect to the reel controlling means.

Obviously, by disconnecting the member 17, the handle may be removed, and this construction also permits the handle to be used on either side of the reel for right and left hand operation.

Slidably but non-rotatably mounted in the sleeve 4 is a hollow rod 32 which, by means to be later described, is movable axially of the shaft 4. As shown in Fig. 4 rod 32 is cut away at 74 throughout a length necessary to avoid interference with the shaft 9, and this rod 32 preferably contains a lubricating wick 75 for the lubrication of the necessary movable parts.

That end of the hollow rod 32 which extends axially of the cage 25 is interiorly threaded to receive the threaded end of a shaft 32'. Shaft 32' will be hereinafter termed the spool shaft. On this shaft is mounted a spool 44 having an inner disc 45 of a diameter slightly less than the interior diameter of the cage, and an outer small disc 46, the disc 45 being preferably flat, and the disc 46 being concave.

Threaded on the spool shaft 32' is a ratchet 48. The face of the disc 45 next the ratchet is provided with a pawl 58 fulcrumed at 57 and held in operative position by a spring 59 (see Fig. 5), the pawl having the usual terminal to cooperate with the teeth of the ratchet 48. The cooperation of the pawl and ratchet permit movement of the reel spool in a direction under the influence of a pull on the line, as under the tug of a fish bite, but prevent independent movement of that spool when the line is being wound on or unwound from the spool. A thin concavo convex disc 47 is passed loosely over the threaded end of the spool shaft 32', the material of which is of more or less resonant character, and the pawl 58 carries a spring clapper 60 which in the movement of the pawl in riding over the teeth of the ratchet 48 strikes the disc 47 and creates a more or less bell-like sound for advising the user of the condition that the line is being drawn upon, for example, when a fish is on the hook.

A brake disc 49 is arranged between the spool disc 45 and the ratchet 48, this brake disc being formed with integral tongues 50 which extend toward the ratchet and out to frictionally engage the same to provide a brake in the free rotation of the spool. This frictional brake is manually controlled to vary its influence through the medium of the means shown particularly in Figure 8. This means includes a sleeve 51 freely slidable in the spool shaft 32' with the sleeve interiorly threaded. The sleeve is connected to a disk 52 through the medium of two arms 53 which are diametrically opposed, and which are engaged in two longitudinal slits formed in the shaft 32'.

On the slitted end of the shaft 32' is threaded a nut 55 and a screw 56 is threaded in the sleeve 51. Through threading movement of the nut 55, the ratchet 48 is moved with respect to the brake disc and to the spring tongues thereon to control the braking influence.

The shaft 9 is provided with a gear 19 meshing with gear 20, so that in the turning of the shaft 9 by means of the handle, the cage 25 is rotated. As the arm 29 is fixed to the shaft 4, and has a pawl 31 which cooperates with the ratchet depressions 28, it is apparent that the cage may, under movement of the handle, be rotated in only one direction. This direction, as will later appear, is for the purpose of winding the line on the spool. The means for compelling this winding during rotation of the cage is through the medium of a pick-up 61, preferably in the form of a wire ring of round form in transverse section to avoid marring the line. The ring has two terminal ends which are bent laterally at 62 as shown in Figure 1, and mounted in an eccentric 63 pivotally supported by member 64 in a narrow elongated casing 65 secured to the outer surface of the peripheral edge of the cage 25 as clearly shown in Figure 2.

The rod 70 is mounted for longitudinal movement in the casing and adjacent the eccentric is formed with a lug 69 to engage an offset 68 in the eccentric. A spring 71 maintains the rod in position to hold it in locking cooperation with the eccentric. The pickup, which has a diameter slightly in excess of that of the cage 25, is arranged for two positions; first, an inoperative position, with the ring disposed in a plane parallel to the axis of the cage, and parallel to and at one side of the spool 44, and, second, an operative position in which the pick-up is at right angles to the axis of the cage and closely adjacent the free forward end thereof. The spring 67 connecting the casing 65 and the pick-up tends to maintain the pick-up in the second position, which is the position for winding the line on the spool. In this position the end of the pick-up remote from the casing 65 is limited by a projection 66 at the edge of the cage. The pick-up is maintained in the first position when the rod 70 is in interlocking cooperation with the eccentric, and caused to move to the second position when the rod 70 has been moved to release the eccentric.

In order to remove the rod 70 to release the eccentric, the rod is provided with a lateral projection 72, which, obviously, moves in a circular path in the rotation of the cage. When this projection 72 reaches a plane beneath the cam-shaped end of the arm 29, which is, of course, fixed, the cam-shaped end of the arm 29 acts to press the projection and thereby the rod 70 against the tension of the spring 71, and in a direction to release the eccentric. The spring 67 immediately acts to move the pick-up to the operative or winding position illustrated in Figure 1.

In order that the line may be wound evenly and in immediately adjacent coils on the spool, the spool is compelled during the winding rotation of the cage to reciprocate inwardly and outwardly in the axial line of the cage. The spool in its inward limit is substantially housed within the cage, and at its outward limit is projected wholly beyond the cage, as shown in Figure 4. During the reciprocal movements of the spool the line is wound in even contacting spirals and superimposed layers on the spool.

The means to accomplish the reciprocation of the spool is shown more particularly in Figures 3 and 4, the means includes a shaft 34 mounted in a projection secured to the standard 2, and in a plate projection depending from the extension 3. This shaft 34 is formed in its peripheral surface with two threads of opposite pitch, and a nut 40 cooperates therewith, to which nut is secured a threaded stud 41, extending through slots 42 and 43 in the extension 3 and hollow shaft 4 and threaded into the rod 32. Obviously, in the movement of the shaft 34, the nut will be reciprocated and compelling a corresponding movement of the spool.

The end of the shaft 34 beyond the nut is provided with a worm gear 37, operated from the gear 19, through the medium of appropriately mounted pinion 35 and worm 36, which cooperates with the worm gear 37 to compel a continuous and relatively retarded movement of the spool inwardly and outwardly of the cage.

That part of the mechanism including the gear systems, the extension 3, the shaft 4 and the means for reciprocating the spool is enclosed in a sectional casing 38, removably secured by appropriate screws.

When the reel is ready for casting, the spool, which may be in any position relative to the cage, is, of course, parallel to the rod, and in the cast, the line is fed off the end of the spool through the guides of the rod without, however, any rotative movement of the spool. In casting, it is conventional practice to guide the line directly in advance of the reel through the thumb, and this may or may not be practiced, as desired. It is to be emphasized, however, that in this operation the spool does not rotate, and the line may be cast from the spool, whether the spool is fully projected with respect to the cage, fully within the cage, or in any intermediate position.

Prior to the casting of the line, the pick-up is turned outwardly into the inoperative position, that is, in a position parallel to the spool at one side of the latter, and wholly free of any contact or influence on the line. In rewinding the line on the spool, the handle is operated, and in the initial operation as previously described, the pick-up is released and moved to a position shown in Figures 1 and 2. This movement causes the pick-up to move over and into contact with the cast line and carry with it the line in the movement of the pick-up toward the operative position, until the line from the spool is positioned between the pick-up and the edge of the cage. As the cage and pick-up are then revolved, as previously described, the line is moved into contact with the turned-in ends 62 of the pick-up where it is held against further movement independently of the pick-up and cage, and compelled to move in the rotative movement of the cage, and pick-up under the influence of the handle. This causes the line to be wound on the spool, as it is, of course, compelled to encircle the spool in the movement of the cage and pick-up. Under the movement of the cage the spool is gradually and relatively slowly moved into and out of the cage on the axial path of the cage and thus the line, during the winding movement of the cage is distributed in even contacting spirals on the spool for smooth and even winding to encure its ready and convenient discharge in the casting operation.

What is claimed as new is:

1. A fishing reel including a line spool mounted for delivery of the line from the spool, means for holding the spool against rotation, a cage mounted for rotation in one direction only concentric with the spool, and a circular pick-up pivotally connected at one point only to the cage and movable on that pivot to a position completely encircling the spool and immediately in advance of the end of the cage to direct the line about the non-rotating spool for winding thereon.

2. A fishing reel including a line spool mounted for delivery of the line from the spool, means for holding the spool against rotation, a cage mounted for rotation in one direction only concentric with the spool, and a circular pick-up pivotally connected at one point only to the cage and movable on that pivot to a position completely encircling the spool and immediately in advance of the end of the cage to direct the line about the non-rotating spool for winding thereon, means for holding the pick-up in a position wholly beyond and free of the line during the unwinding movement from the spool, and means to release the pick-up in the initial movement of the cage to cause the pick-up to move into a position at right angles to the axis of the cage and carry the line between the cage and pick-up for winding the line on the spool.

3. A construction as defined in claim 1 wherein during the movement of the cage the spool is reciprocated axially of the cage.

4. A construction as defined in claim 1 wherein during the movement of the cage the spool is reciprocated axially of the cage, the movement of the spool being at a reduced speed as compared with the movement of the cage.

5. A construction as defined in claim 1 wherein means are provided for rotating the cage in one direction, said means being operable from either side of the reel to accommodate the same for either right or left hand operators.

6. A reel including a spool for carrying the line, a shaft on which the spool is mounted, cooperating means on the shaft and spool for preventing at will the spool from turning in either direction, and means including a double threaded shaft for moving the spool carrying shaft and spool reciprocatorily, a cage concentric with the spool, means for operating the cage in one direction, means for preventing the cage from moving in the oppostie direction, a circular pick-up for the line, an eccentric to which the pick-up is connected, a rod interlocking with the eccentric for holding the pick-up parallel to the axis of the cage, and means within the cage for releasing the eccentric to permit the pick-up to move to a position adjacent the end of the cage at right angles to the axis thereof and concentric with and completely surrounding the spool.

7. A construction as defined in claim 6 wherein the means for locking the eccentric includes a rod having locking cooperation with the eccentric in one position, and a fixed arm operating the rod in the revolution of the cage to withdraw the rod from locking cooperation with the eccentric, and a spring for moving the pick-up into an operative position with respect to the cage when the eccentric is unlocked.

8. A construction as defined in claim 1 including a signal means operated under pull on the line to compel a slight rotative movement of the spool for indicating a tension on the line as in the bite of a fish.

9. A construction as defined in claim 6 including an operating shaft, a removable handle cooperating with the shaft for actuating the same, a gear carried by the shaft, a member fixed to the cage and including a gear cooperating with the gear on the shaft, an arm fixed against movement within the cage, a pawl carried by the arm and ratchet sockets on the member with which the pawl cooperates to prevent movement of the cage in one direction while permitting its movement in the opposite direction.

10. A construction as defined in claim 6 including a standard to be removably connected to the fishing rod, a hollow shaft mounted in the standard, an operating rod mounted on the standard and extending through the shaft, said rod projecting in both directions beyond the standard, an operating handle, and means on each end of the rod to receive the handle for operating the rod from the right or left hand side of the reel.

11. A construction as defined in claim 6 wherein the means for operating the cage in one direction includes an operating shaft, and a gearing train between the operating shaft and the cage and between the operating shaft and the double threaded shaft for reciprocating the spool.

12. A construction as defined in claim 6 wherein the cooperating means on the shaft and spool for preventing the spool from turning in either direction includes a brake for controlling free movement of the spool, and means arranged at one end of the spool for controlling the brake.

13. A construction as defined in claim 1 wherein the pick-up has a line operative position concentric with the spool and a line inoperative position parallel and to one side of the spool axis.

14. A construction as defined in claim 1 wherein the pick-up has a line operative position concentric with the spool and a line inoperative position parallel and to one side of the spool axis, and wherein means are provided for holding the pick-up in inoperative position against casual displacement.

15. A construction as defined in claim 1 wherein the pick-up in operative position directs the line toward the spool at substantially right angles to the axis of the spool.

16. A construction as defined in claim 1 wherein the pick-up in operative position directs the line toward the spool at substantially right angles to the axis of the spool, and wherein the spool is reciprocated within and axially of the pick-up during such line directing.

PAUL EDMOND GAIRE.